United States Patent
Zhu et al.

(10) Patent No.: US 10,378,969 B2
(45) Date of Patent: Aug. 13, 2019

(54) TEMPERATURE SENSOR

(71) Applicant: Infineon Technologies AG, Neubiberg (DE)

(72) Inventors: Di Zhu, Singapore (SG); Chin Yeong Koh, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 146 days.

(21) Appl. No.: 15/591,591

(22) Filed: May 10, 2017

(65) Prior Publication Data
US 2018/0328792 A1    Nov. 15, 2018

(51) Int. Cl.
*G01K 7/34* (2006.01)

(52) U.S. Cl.
CPC ..................... *G01K 7/34* (2013.01)

(58) Field of Classification Search
CPC ....................................................... G01K 7/34
See application file for complete search history.

(56) References Cited

U.S. PATENT DOCUMENTS

| | | | | |
|---|---|---|---|---|
| 4,613,950 A * | 9/1986 | Knierim | ................ | G04F 10/105 341/120 |
| 6,052,035 A * | 4/2000 | Nolan | ................... | H03K 3/011 331/111 |
| 6,055,489 A * | 4/2000 | Beatty | ................... | G01K 3/005 327/512 |
| 6,078,208 A * | 6/2000 | Nolan | ...................... | G01K 7/01 327/512 |
| 6,280,081 B1 * | 8/2001 | Blau | ........................ | G01J 1/18 323/316 |
| 7,075,360 B1 * | 7/2006 | Holloway | ............... | G05F 3/262 327/513 |
| 7,847,625 B2 * | 12/2010 | Roh | ...................... | H03H 19/004 327/337 |
| 7,911,181 B2 * | 3/2011 | Raidl | ................... | H03H 7/0153 320/132 |
| 8,217,708 B2 * | 7/2012 | Yoshikawa | .............. | G01K 7/01 323/316 |
| 8,803,725 B2 * | 8/2014 | Osaki | ................. | H03M 1/1014 324/76.11 |
| 9,182,295 B1 * | 11/2015 | Perrott | .................... | G01K 7/226 |
| 10,079,610 B2 * | 9/2018 | Bogner | ................. | H03M 1/109 |
| 2007/0241833 A1 * | 10/2007 | Nervegna | .............. | H03K 3/011 331/176 |
| 2009/0129438 A1 * | 5/2009 | Pan | .......................... | G01K 7/01 374/170 |
| 2009/0219129 A1 * | 9/2009 | Denier | ..................... | H03F 1/08 338/25 |
| 2010/0013544 A1 * | 1/2010 | Niederberger | ........... | G01K 7/01 327/513 |
| 2010/0123510 A1 * | 5/2010 | Yoshikawa | .............. | G01K 7/01 327/512 |
| 2013/0121372 A1 * | 5/2013 | Wenn | ...................... | G01K 7/22 374/102 |
| 2014/0269839 A1 * | 9/2014 | Tai | ........................... | G01K 7/34 374/184 |

(Continued)

*Primary Examiner* — Lisa M Caputo
*Assistant Examiner* — Philip L Cotey
(74) *Attorney, Agent, or Firm* — Shumaker & Sieffert, P.A.

(57) ABSTRACT

Methods and devices are provided where a first current and a second current are provided selectively to a semiconductor component, and times for charging a capacitor to a voltage at the semiconductor component are provided.

20 Claims, 6 Drawing Sheets

(56) References Cited

U.S. PATENT DOCUMENTS

2014/0368222 A1* 12/2014 Curtis ................ G01D 5/2405
    324/672
2015/0035550 A1*  2/2015 Chinnakonda Kubendran ............
    G01R 27/2605
    324/686
2017/0016776 A1*  1/2017 Ma .......................... G01K 3/04

* cited by examiner

TEMPERATURE SENSOR

TECHNICAL FIELD

The present application relates to temperature sensors and to methods associated with such temperature sensors.

BACKGROUND

Temperature sensors are used in various systems to measure a temperature of the system or parts thereof, for example to detect overtemperatures. One application of such temperature sensors is in so-called smart systems, which incorporate functions of sensing, actuation and control in order to describe and analyze a situation, and make decisions based on the available data in a predictive or adaptive manner. Conventionally, temperature sensors used in such applications include sigma-delta analog to digital converters (ADC) to convert the sensed temperature into digital data and to achieve a high resolution. In some applications, due to a requirement of a high frequency burst clock (for example 150 MHz clock and 82 µs burst) clocking the ADC, conventional sigma-delta ADCs are sometimes not quite suitable as they consume too much power when clocked in this way.

Some temperature sensors conventionally used are based on the temperature-dependent behavior of semiconductor devices, in particular PN diodes or bipolar transistors coupled as diodes. This temperature-dependent behavior is at least in part due to the fact that the bandgap of semiconductors varies with temperature, in particular decreases with temperature. Conventional solutions may have drawbacks like comparatively small temperature range, high power consumption or comparatively large chip area requirements.

SUMMARY

According to an embodiment, a device is provided, comprising:
a capacitor,
a semiconductor component,
a current generator, wherein the current generator is configured to supply a charging current to the capacitor and to selectively supply at least a first current or a second current different from the first current to the semiconductor component, and
a time evaluation circuit coupled to the capacitor and to the semiconductor component and configured to measure a first charging time for charging the capacitor to a first voltage at the semiconductor component while the first current is supplied to the semiconductor component and a second time for charging the capacitor to a second voltage at the semiconductor component while the second current is supplied to the semiconductor component.

According to another embodiment, a method is provided, comprising:
providing a first current to a semiconductor device,
measuring a first charging time for a capacitor to reach a first voltage at the semiconductor device while the first current is supplied,
providing a second current to the semiconductor device different from the first current, and
measuring a second charging time for the capacitor to reach a second voltage at the semiconductor device while the second current is supplied to the semiconductor device.

According to yet another embodiment, a temperature sensor device is provided, comprising:
a current generator,
a capacitor coupled to the current generator,
a switch coupled in parallel to the capacitor,
a semiconductor component coupled to the current generator,
a comparator, wherein a first input of the comparator is coupled to a node between the current generator and the capacitor and wherein a second input of the current generator is coupled to a node between the current generator and the semiconductor component,
a counter coupled to an output of the comparator,
wherein the current generator is switchable between supplying a first current to the semiconductor component and supplying a second current different from the first current to the semiconductor component.

The above summary is merely intended to give a brief overview over some features of some embodiments for illustration purposes and is not to be construed as limiting. In particular, other embodiments may comprise other features than the ones set forth above.

DETAILED DESCRIPTION

Figure 1:
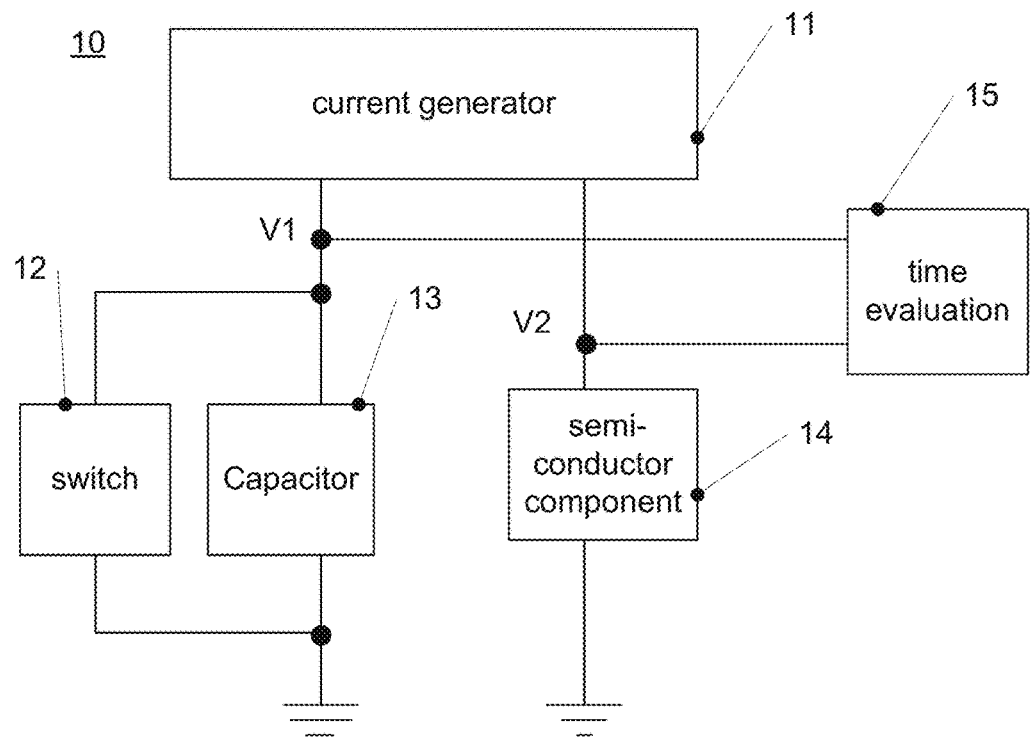
FIG. 1 is a block diagram illustrating a temperature sensor according to an embodiment.

In the following, various embodiments will be described in detail with reference to the attached drawings. It has to be noted that these embodiments serve as illustrative examples only and are not to be construed as limiting the scope of the present application. For example, while an embodiment may be described as comprising a plurality of features or elements, this serves illustration purposes only, and in other embodiments, some of these features or elements may be omitted and/or may be replaced by alternative features or elements. Furthermore, in some embodiments, additional features or elements in addition to those described herein or shown in the drawings may be provided, for example features or elements conventionally used in temperature sensors and smart systems, without departing from the scope of the present application. Features or elements from different embodiments may be combined with each other to form further embodiments. Variations or modifications described with respect to one of the embodiments, may also be applied to other embodiments.

Any direct electrical connection or coupling shown in the drawings or described herein, i.e. connection or coupling without intervening elements, may also be implemented as an indirect connection or coupling, i.e. connection or coupling with one or more additional intervening elements, and vice versa, as long as the general function of the connection or coupling, for example to transmit a certain kind of information or signal or to provide a certain kind of control, is essentially maintained. In other words, modifications to connections or couplings may be performed as long as they do not essentially change the function of the respective connection or coupling. Connections or couplings related to the transmission of information (in contrast for example to connections or couplings which are designed to generate a certain voltage drop) may be implemented as wire-based connections or couplings or as wireless connections or couplings, or mixtures thereof.

Some embodiments, as will be described in detail later, use a comparator-based time mode temperature sensor. In such sensors, instead of a conventional voltage domain sigma-delta analog to digital converter, a comparator is employed. In some embodiments, a voltage at a charging capacitor is compared to a voltage at a semiconductor component like a bipolar transistor or a diode, and charging times until the voltage at the capacitor reaches the voltage at the semiconductor component may be measured. Such a measurement may be performed for more than one current applied to the semiconductor component and therefore voltage at the semiconductor component.

Turning now to the figures, FIG. 1 is a schematic block diagram of a temperature sensor device 10 according to an embodiment.

The embodiment of FIG. 1 comprises a current generator 11 configured to generate a current for charging a capacitor 13 and providing another current to a semiconductor component 14. Semiconductor component 14 may be a semiconductor component having a PN junction, for example a PN diode or a bipolar transistor coupled as a diode. Capacitor 13 may be any suitable capacitor and may have a capacitance value in the range of about 5 pF to about 20 pF, for example about 10 pF. When charging capacitor 13, a voltage V1 increases. A time evaluation circuit 15 may measure a charging time voltage V1 takes to reach a voltage V2 at the semiconductor component 14. This time measurement may for example be made by using a counter, which counts until V1 reaches V2. A comparator may be used for detecting V1 reaching V2. Non-limiting examples for such implementations of time evaluation circuit 15 will be discussed later. When V1 reaches V2, the counter may be reset, and a switch 12 may be closed to discharge capacitor 13.

Current generator 11 in some implementations may generate a current which is proportional to absolute temperature (PTAT), also referred to as PTAT current herein. In other implementations, a current which is constant with temperature (CTAT) may be used. Current generator 11 may comprise circuits generating such currents, which may be implemented in any conventional manner.

The above measurement of the charging time may be repeated several times to more accurately detect the time in some embodiments. Furthermore, in embodiments the charging time is measured at least for two different currents supplied to semiconductor component 14 corresponding to at least two different voltages V2. Based on the thus measured two different times, in embodiments then the temperature may be determined. Non-limiting examples will be described later.

Generally, using a bipolar transistor coupled as a diode as an example for the semiconductor component, a parameter µ indicative of the temperature may be calculated according to:

$$\mu = \frac{\alpha \cdot \Delta V_{BE}}{V_{BE} + \alpha \cdot \Delta V_{BE}} \quad (1)$$

$\alpha$ is a constant, $V_{BE}$ is the base emitter voltage of the bipolar transistor, and $\Delta V_{BE}$ is a difference in base emitter voltages for different currents. $\alpha$ may have a value of approximately 10, depending on the implementation, and may be determined by calibration.

This equation (1) may be written as $$\mu = \frac{\frac{I_1 \cdot t_{\alpha \Delta V_{BE}}}{C_1}}{\frac{I_3 \cdot t_{BE}}{C_1} + \frac{I_1 \cdot t_{\alpha \Delta V_{BE}}}{C_1}} \quad (2)$$

where $I_1$ is the current charging a capacitor $C_1$ (for example capacitor 13 of FIG. 1, by $\Delta V_{BE}$, $I_3$ is a current when charging the voltage at the capacitor to $V_{BE}$, $t_{BE}$ is the time needed for charging to $V_{BE}$, and $t_{\alpha \Delta V_{BE}}$ is the time needed to increase the voltage by $\Delta V_{BE}$. If the same currents are used, i.e. $I_1 = I_3$, this simplifies to $$\mu = \frac{t_{\alpha \Delta V_{BE}}}{t_{BE} + t_{\alpha \Delta V_{BE}}} \quad (3)$$

Equation (3) indicates that by time measurements, µ may be determined. The temperature itself may then be calculated based on µ according to $$T = A_{CAL} \cdot \mu + B_{off} \quad (4)$$

wherein T is the temperature in degrees centigrade and $A_{CAL}$ and $B_{off}$ are coefficients which may be obtained by calibration and which are specific to a respective temperature sensor.

Figure 2A:
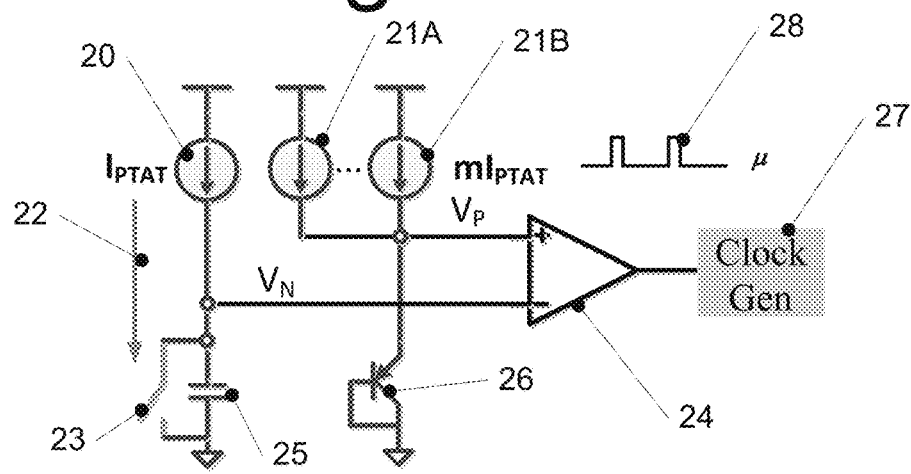
FIG. 2A is a circuit diagram illustrating a temperature sensor according to an embodiment in a first measurement phase.
Figure 2B:
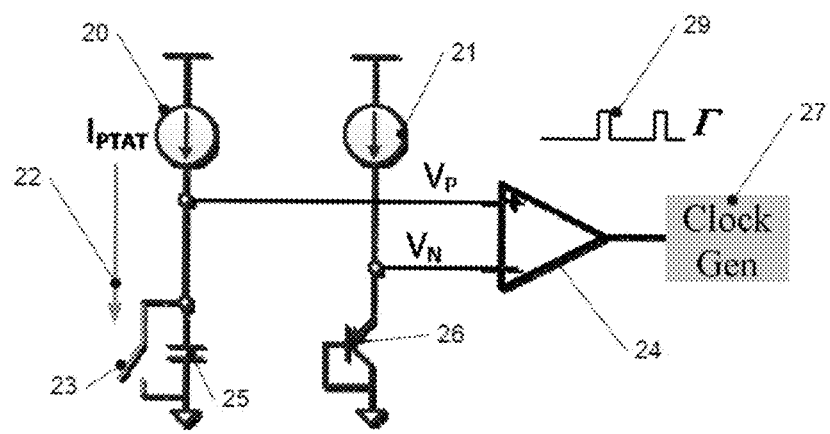
FIG. 2B is a circuit diagram of the temperature sensor of FIG. 2A in a second measurement phase.

As mentioned above, in embodiments time measurements with two different currents through a semiconductor component like semiconductor component 14 of FIG. 1 may be used. This will now be explained in more detail referring to FIGS. 2A and 2B. FIG. 2A illustrates a temperature sensor device according to an embodiment in a first state when a first current is applied to a bipolar transistor 26 coupled as a diode, and FIG. 2B illustrates the device in a second state where a second current different from the first current is applied to bipolar transistor 26.

In FIG. 2A, in particular a current source 20 provides a first current $I_{PTAT}$ to a capacitor 25 for charging capacitor 25, as indicated by an arrow 22. A switch 23 is provided for discharging capacitor 25. A voltage at capacitor 25 is labeled $V_N$ in FIG. 2A and is provided to a negative input of a comparator 24. $I_{PTAT}$ in the embodiment of FIGS. 2A and 2B is a current proportional to absolute temperature, although other currents may also be used.

Moreover, a current which is m times IPTAT is provided to bipolar transistor 26, as symbolized by m current sources 21A, . . . , 21B. It should be noted that no m separate current source 21A to 21B need to be provided, but for example a single current source supplying the current mIPTAT or an adjustable current source may also be provided. m may be an integer number, although this need not be the case. A voltage VP at bipolar transistor 26 is fed to a positive input of comparator 24.

When charging capacitor 25, as soon as $V_N$ reaches $V_P$, an output signal of comparator 24 changes. Upon this change, switch 23 is closed to discharge capacitor 25, which causes the output of comparator 24 to change again. A clock generator circuit 27 may be used to filter or otherwise process this output signal to provide a signal 28 with pulse, a time distance between the pulses corresponding to the charging time of capacitor 25. In an embodiment, the pulses of signal 28 may be then be used to reset a counter, such that a count the counter reaches before the next pulse represents the charging time.

This time $t_1$ is equal to $$t_1 = \frac{V_C \times C}{I_{PTAT}} = \frac{V_T \ln\left(\frac{mI_{PTAT}}{I_S}\right) \cdot C}{I_{PTAT}} \quad (5)$$

where $V_C$ is the voltage reached at the capacitor 25, C is the capacitance of capacitor 25, $I_{PTAT}$ is the current generated by current source 21, $V_T$ is the "thermal voltage" k·T/q, where k is the Boltzmann constant, q is the electron charge and T the absolute temperature, and $I_S$ is the reverse saturation current.

FIG. 2B illustrates the temperature sensor of FIG. 2A in a second state. In contrast to FIG. 2A, in FIG. 2B the same current $I_{PTAT}$ is provided to capacitor 25 for charging and to bipolar transistor 26. This results in a signal 29 having different time distances between its pulses and therefore to a different time $t_2$ according to $$t_2 = \frac{V'_C \times C}{I_{PTAT}} = \frac{V_T \ln\left(\frac{I_{PTAT}}{I_S}\right) \cdot C}{I_{PT}} \quad (6)$$

wherein $V'_C$ is the voltage now reached when charging in the capacitor 25 in the situation of FIG. 2B.

The value $\Delta V_{BE}$ mentioned above then may be represented by the time difference $$t_1 - t_2 = \frac{V_T \ln(m) \cdot C}{I_{PTAT}} \quad (7)$$

As $\Delta V_{BE}$ is equal to $V_T \ln(m)$, the time difference $t_1-t_2$ may be used to represent $\Delta V_{BE}$.

Equations (1) to (3) may be written as $$\mu = \frac{\alpha(t_1 - t_2)}{\alpha(t_1 - t_2) + t_2} = \frac{\alpha V_T \ln m}{\alpha V_T \ln m + V_{BE}} \quad (8)$$

In this way, $\mu$ may be calculated based on the measured times, and the temperature may then be determined according to equation (4) above, i.e.

$$T = A \cdot \frac{\alpha V_T \ln m}{\alpha V_T \ln m + V_{BE}} + B = A \cdot \frac{\alpha(t_1 - t_2)}{\alpha(t_1 - t_2) + t_2} \quad (9)$$

Therefore, in this way the temperature may be determined based on time measurements. The temperature sensor discussed above may be operated at high clock speeds, for example about 150 MHz burst clock in some implementations, and in some implementations may have a low current consumption, for example less than 500 μA depending on the application.

Figure 3:
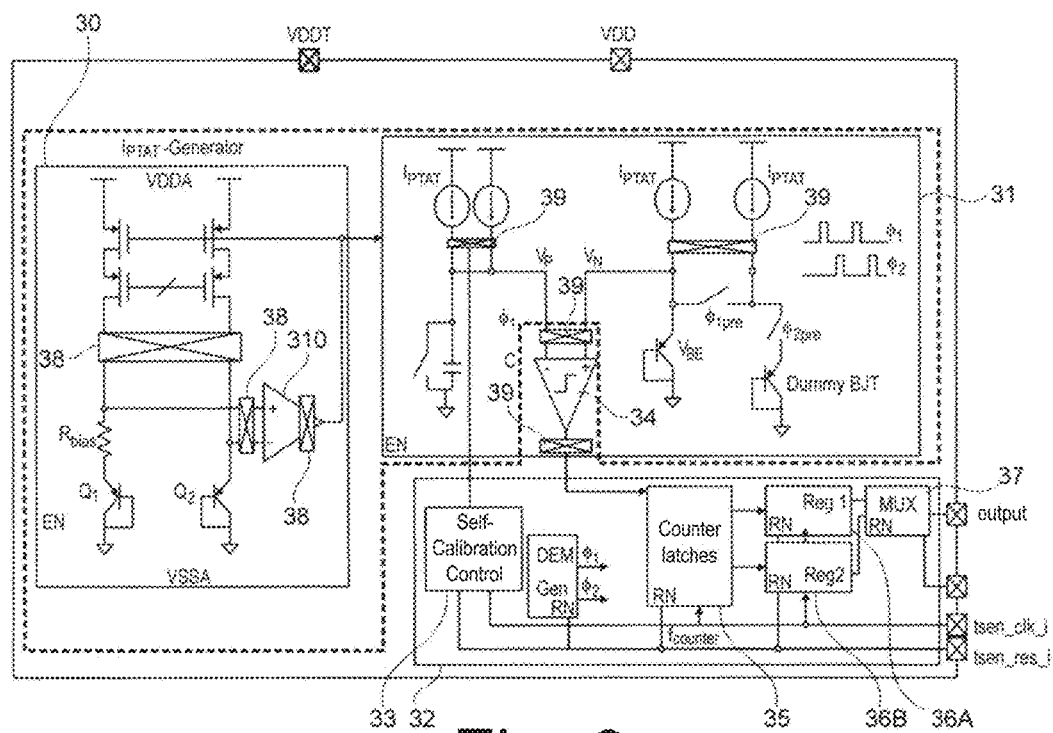
FIG. 3 is a detailed circuit diagram of a temperature sensor according to an embodiment.

FIG. 3 illustrates a temperature sensor according to an embodiment. The embodiment of FIG. 3 comprises a current generator 30 which generates a current $I_{PTAT}$ proportional to absolute temperature using transistors Q1, Q2 and a bias resistor $R_{bias}$ as illustrated in FIG. 3. Furthermore, as shown current mirrors are provided to mirror the current, and an amplifier 310 having a differential input and a single output is provided to amplify a difference between voltages in a first branch comprising $R_{bias}$ and Q1 and a second branch comprising Q2. To reduce non-ideal influences of mismatches and offset voltages of amplifier 310, choppers 38 are provided as shown. Control pins may be provided to control the chopping of choppers 38.

A circuit part 31 essentially is configured as discussed with reference to FIGS. 2A and 2B, a comparator 34 essentially corresponding to comparator 24 of FIGS. 2A and 2B. The current sources shown in circuit part 31 may make use of a current generated by current generator 30. In particular, in circuit part 31 two different bias currents are provided to a bipolar transistor to generate different base emitter voltages $V_{BE}$, and a capacitor is charged by a current until the voltages $V_P$ and $V_N$ match, as explained previously with respect to FIG. 2, which match is detected by a comparator 34. Choppers 39 may be provided to the current sources and to comparator 34 to minimize offset and mismatches. Pins may be provided to control this chopping.

An output of comparator 34 is provided to a digital part generally labelled 32 in FIG. 3, in particular a counter, which is clocked by a frequency $f_{counter}$ and which serves to measure the time (in term of counter value) for the voltage $V_P$ to reach $V_N$. Corresponding counter values (which correspond to time values) for the two different currents provided to the bipolar transistors are stored in registers 36A, 36B, respectively, and are output at an output pin using a multiplexer 37. In other embodiments, separate output pins may be provided. Based on these two values, a further circuit may then calculate the temperature based on equations (8) and (9). In other embodiments, this calculation may be performed in digital part 32, and a value indicating the temperature may be output.

Furthermore, digital part 32 comprises a self-calibration control circuit 33 which may be used to perform a self-calibration of the current sources supplying the current to charge the capacitor and/or to generate a voltage over a semiconductor device like a bipolar transistor or a diode. Such a calibration may be used to at least partially compensate process, voltage and temperature variations (PVT variations) of absolute values of the capacitor and/or components used for generating the currents, for example the components of current generator 30 of FIG. 3. In particular, depending on the implementation capacitance values and/or current values may vary significantly depending on a process corner when manufacturing corresponding semiconductor devices. This, without calibration, could for example lead to significant time differences for the measurement. A more detailed example for such calibration will be explained later referring to FIGS. 5 to 7.

Figure 4:
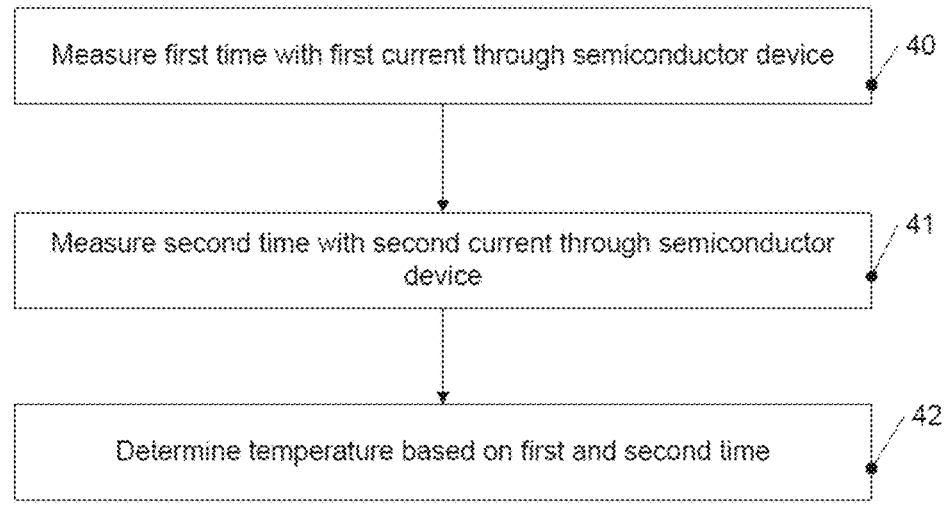
FIG. 4 is a flowchart illustrating a method according to an embodiment.

Before explaining an example for such a calibration in more detail, a temperature measurement method according to an embodiment will be discussed referring to FIG. 4. While the method of FIG. 4 is depicted as a series of acts or events, the order in which these acts or events are presented is not to be construed as limiting. Moreover, while for conciseness' sake and to avoid repetitions, the method of FIG. 4 will be described referring to FIGS. 1 to 3 and the explanations already made, the method of FIG. 4 may also be used in other devices than the ones shown in FIGS. 1 to 3.

At 40, a first time for charging a capacitor is measured with a first current flowing through a semiconductor device to generate a reference voltage up to which the capacitor is charged.

At 41, a second time is measured with a second current flowing through the semiconductor device. The measurements at 40 and 41 may for example be performed as explained with reference to FIGS. 2A and 2B, respectively, using a comparator and/or a counter.

At 42, a temperature is determined based on the first and second times, for example according to equation (9) as explained above.

Next, self-calibration will be explained referring to FIGS. 5 to 7.

Figure 5:
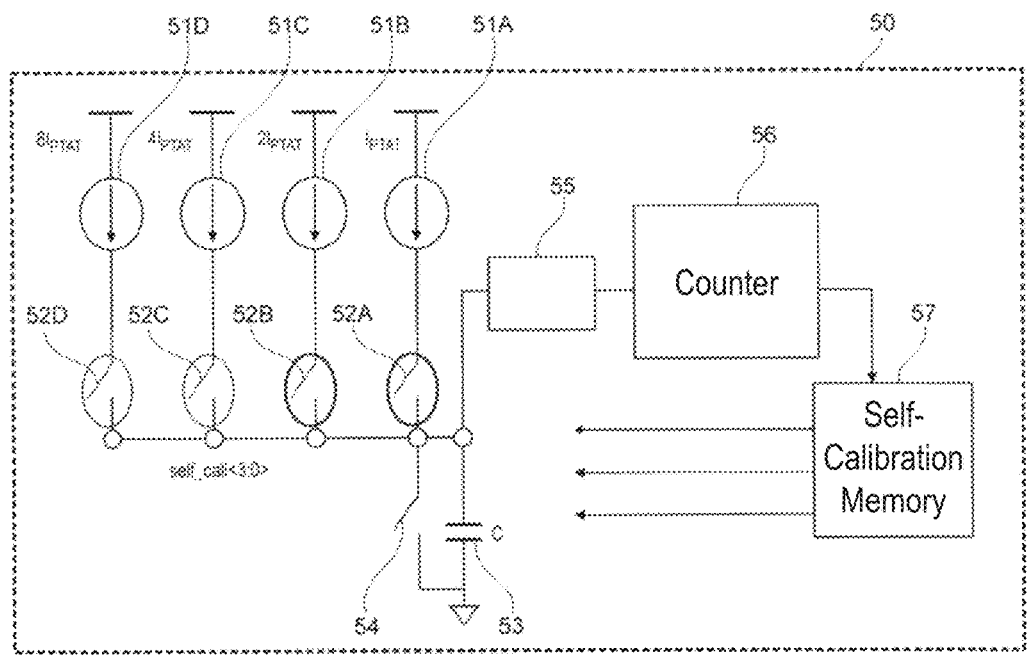
FIG. 5 is a diagram illustrating self-calibration according to some embodiments.

FIG. 5 is a schematic diagram of a part 50 of a temperature sensor device according to an embodiment for illustrating self-calibration. FIG. 6 is a flowchart of a method illustrating self-calibration using the device of FIG. 5.

In FIG. 5, for device part 50 four current sources 51A to 51D are shown for charging a capacitor 53, which may correspond to capacitor 25 of FIGS. 2A and 2B or to capacitor 13 of FIG. 1.

In the example of FIG. 5, current sources 51A to 51D, have binary current values, i.e. current source 51D generates twice the current of current source 51C, which generates twice the current of current source 51B which generates twice the current or current source 51A. The currents are labelled $8I_{PTAT}$, $4I_{PTAT}$, $2I_{PTAT}$ and $I_{PTAT}$ in FIG. 5.

Switches 52A to 52D are associated with current sources 51A to 51D, respectively, to selectively couple the current sources to capacitor 53. A further switch 54 serves for discharging capacitor 53, similar to switch 23 of FIGS. 2A and 2B or switch 12 of FIG. 1.

By selectively closing one or more of switches 52A to 52D (collectively referred to as switches 52 herein) a current supplied to capacitor 53 for charging may be adjusted. In embodiments, charging may be adjusted such that the time for fully charging capacitor 53 is at or around a predetermined value, for example of the order of 60 to 80 μs, for example about 65 μs. The charging time is detected by a comparator 55 together with a counter 56 in a similar manner to the charging of the capacitor discussed referring to FIGS. 1 to 3. For example, a counter up to a voltage at capacitor 53 reaching a reference voltage or a voltage across the mentioned semiconductor device like a bipolar transistor may be used. Based on the resulting of the counter and adjusting of switches, a position of switches 52 (opened or closed) is stored in a self-calibration memory 57 and then used for controlling switches 52, for example by using a 4 bit value self_cali<3:0>.

In some embodiments, a current of the current source supplying the highest current (current source 51D in the example of FIG. 5) may be set to be the lowest current needed for charging at or around the predetermined time under all process variations to be covered. Other embodiments or other techniques may also be used.

Figure 6:
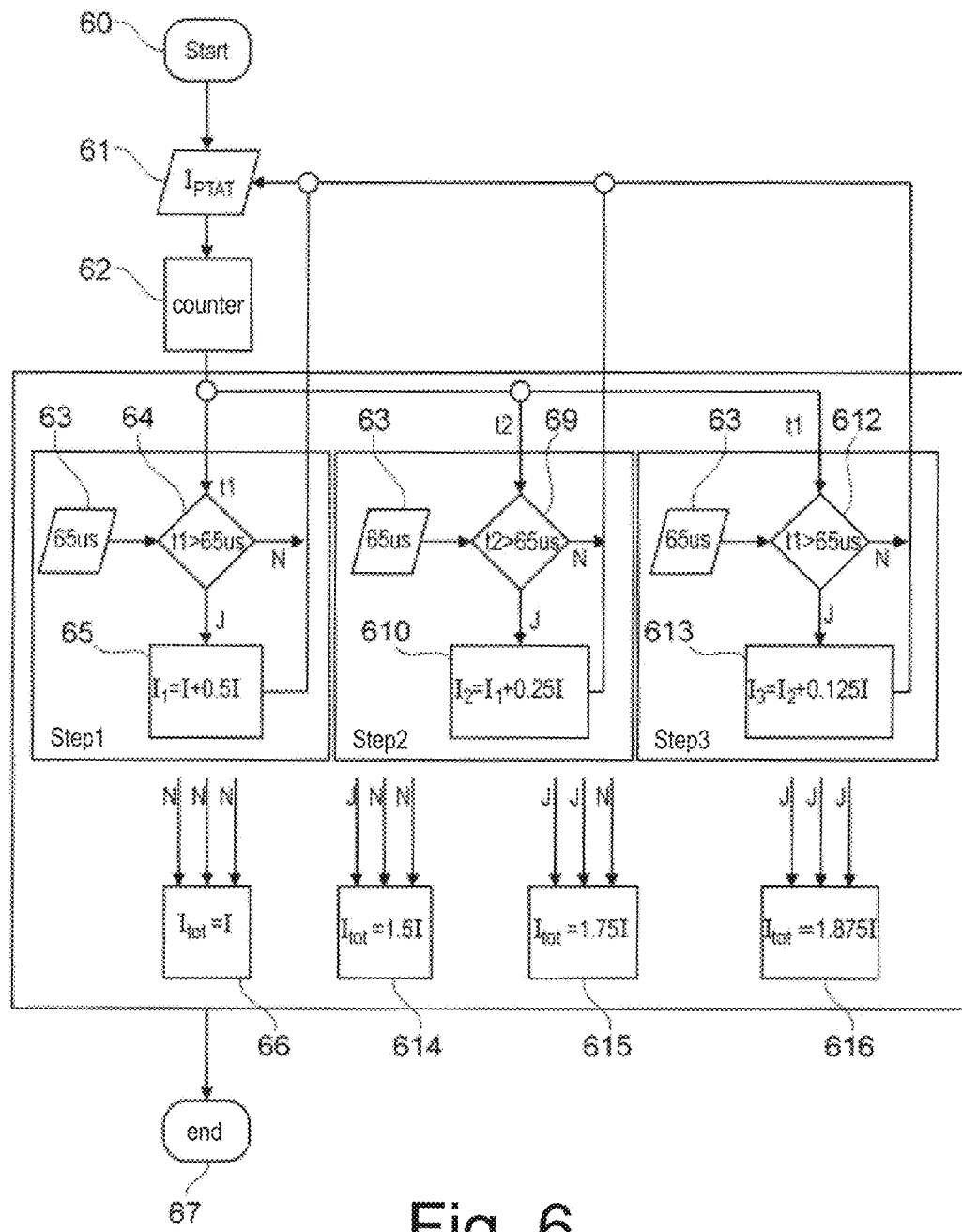
FIG. 6 is a flowchart illustrating an example self-calibration method.

FIG. 6 is a flowchart illustrating a calibration method using the device shown in FIG. 5. The method of FIG. 6 starts at 60 and, at 61, supplies a current, in this case a current proportional to absolute temperature (PTAT current, in the present example using current source 51D of FIG. 5, i.e. the current source with the highest current). AT 61, a counter value is obtained related to a charging time. At 64, it is checked if this charging time exceeds a predetermined value stored at 63, for example 65 μs, although other values may also be used depending on resolution requirements (i.e. how many measurements are possible per time) and length of bursts used for clocking (charging time should be lower than burst length).

If the charging time exceeds 65 μs (Y at 64), this means that more current is needed for charging. If this is not the case (N), no more current is needed, and at 66 the total current is set to the current I of the current source supplying the lowest current, $8I_{PTAT}$ by current source 51D in the example of FIG. 5. Otherwise, at 65, the next current source (51C in this case) is activated, increasing the current by 50%. Then, a next measurement by counter 62 is provided, and at 69 it is checked if the time (now t2) still exceeds the predetermined value stored at 63. If this is not the case (N), the current is now sufficient, and at 614 the total current is set to 1.5 times the current of the strongest current source, or, in other words, current sources 51C and 51D used (i.e. switches 52D and 52C closed, switches 52B and 52A open).

In case the time is still above the predetermined value, in the example 65 μs (Y at 69), the current is increased by another quarter of the original current at 610, which corresponds to closing switch 52B associated with current source 51B. The procedure is then continued by measuring the charging time again, and at 612 it is checked again if the time is still greater than the predetermined value, for example 65 μs. If this is not the case, the current is now sufficient, and at 615 1.75 times the current of the strongest current source is output as the calibration result, corresponding to switch 52A open and switches 52B to 52D closed, such that current sources 51B to 51D contribute to the charging current.

If the predetermined time is still exceeded, at 613 another 0.125 times the current of the strongest current is added, which corresponds to additionally closing of switch 52A such that current source 51A also contributes to the charging current. In this case, at 616 the total current is set to 1.875 times the current of the strongest current source, which corresponds to all switches 52A to 52D being closed.

Therefore, with the method of FIG. 6 a desired charging time (in the example 65 μs) may be reached within the accuracy of the current sources available. It should be noted that the scheme of FIG. 6 is merely an example, and other calibration methods may be used as well. For example, another calibration scheme may add first supply a current with all switches closed, and check if the charging time is too fast, i.e. below a desired value. In other embodiments, more or less than four current sources with four switches may be used, and/or a single adjustable current source may be used. Therefore, FIGS. 5 and 6 show only one example for adjusting a charging current for the capacitor to approximate a desired charging time.

Figure 7:
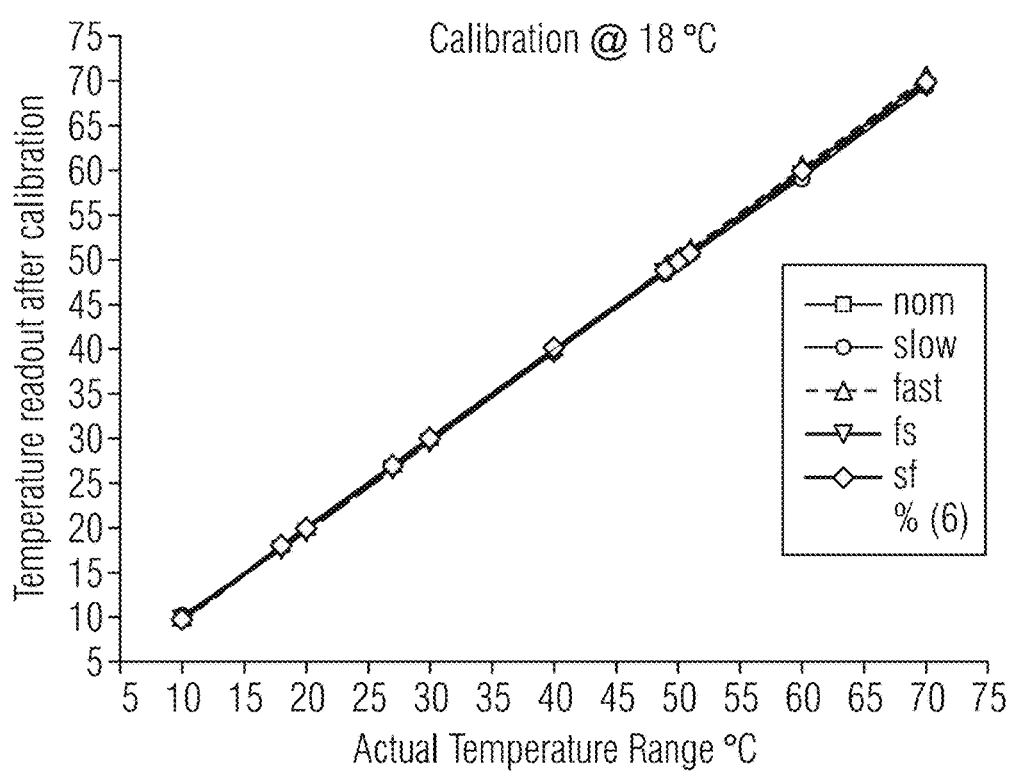
FIG. 7 is a diagram illustrating an effect of self-calibration.

FIG. 7 illustrates the effect of a calibration like the one discussed above. In the example of FIG. 7, the calibration was performed at a temperature of 18 C° (i.e. essentially room temperature) for a plurality of process corners (nominal, slow, fast, fast-slow and slow-fast). The graph in FIG. 7 illustrates the temperature read out from a calibrated temperature sensor after the self-calibration described over the actual temperature. As can be seen, deviations between the different process corners are minimized by the calibration. For example, in some embodiments, a temperature accuracy of the order of 1 C° may be obtained.

Besides that internal calibration, a calibration of the parameters $A_{CAL}$ and $B_{off}$ of equation (4) may be performed.

To this end, an output of the temperature sensor may be obtained for one or more reference temperatures (for example 0 C° corresponding to 273.15 K or any other calibration temperature $T_{cali}$), and parameters $A_{CAL}$ and $B_{off}$ may be determined so that the temperature calculated based on equation (4) for this sensor output matches the reference temperature. For example, parameter $A_{CAL}$ may then be estimated as $$A_{CAL} = \frac{T_{cali} \times V_{BG}}{V_{BG} - V_{BE@cali}} \quad (10)$$

wherein $V_{BE@cali}$ is the base emitter voltage at the calibration temperature. B may then be estimate as $$B_{off} = T_{cali} - A_{\mu cali} \quad (11)$$

wherein $\mu_{cali}$ is the value $\mu$ at the calibration temperature $T_{cali}$.

For calibration data, the times t1, t2 at the calibration temperature measured may be averaged over a plurality of measurements or bursts, for example 96 bursts or 384 bursts. The number of bursts over which the times are averaged may be adjustable, also for temperature measurements in normal operation.

Figure 8:
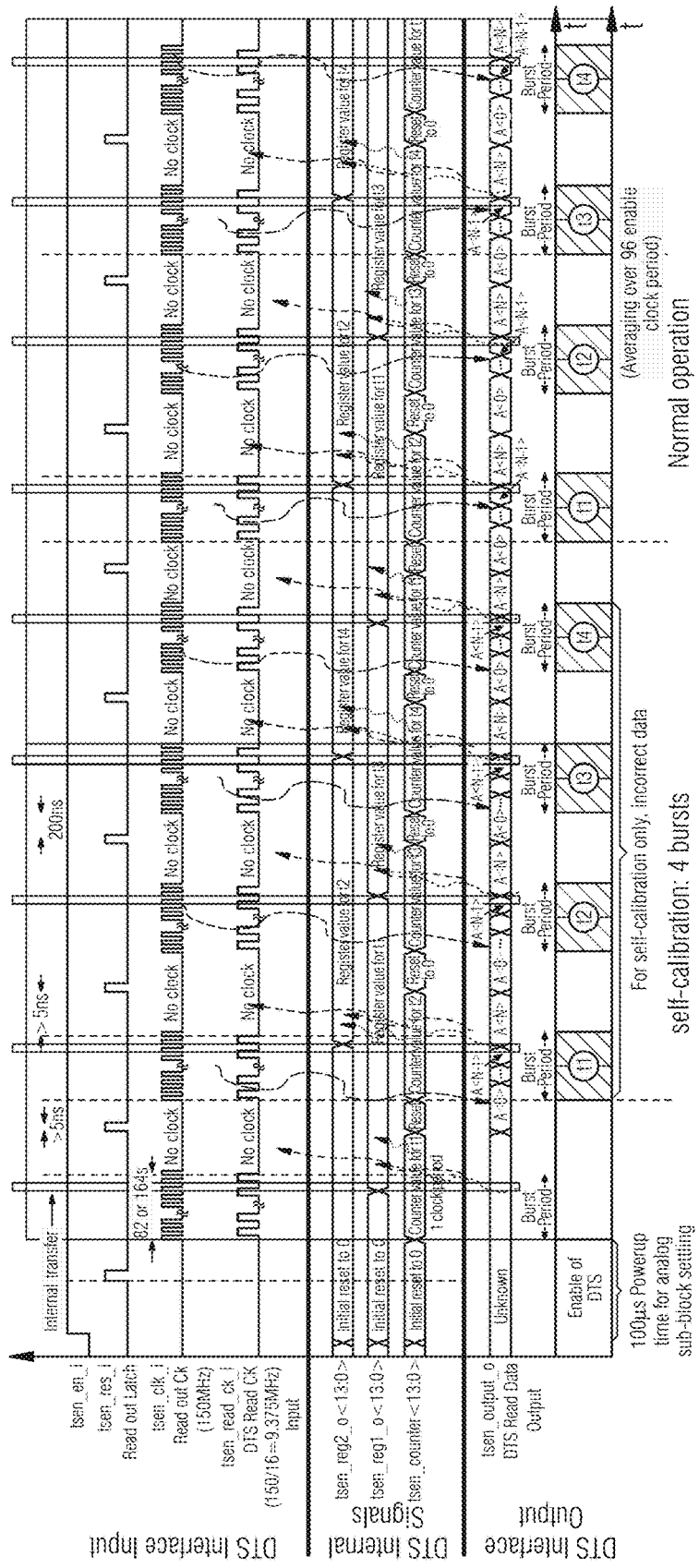
FIG. 8 illustrates example signals according to some embodiments.

FIG. 8 illustrates an example timing diagram for a temperature sensor (DTS, digital temperature sensor) according to an embodiment similar to the embodiment illustrated in FIG. 3.

A section generally labeled "DTS interface input" illustrates input signals, namely an enable signal tsen_en_i, a reset signal tsn_res_i, a burst clock signal tsen_clk_i and a read out signal tsn_read_ck_i.

A section labeled "DTS internal signals" illustrates internal signals, in particular a value in a first register (for example register 36A of FIG. 3) tsn_rec1_o<13:0>; a value of a second register (for example register 36B of FIG. 3) tsn_rec2_o<13:0>, and a counter value (for example of counter 35) tsn_counter<13:0>. These internal signals in the example of FIG. 8 are 14 bit values corresponding for example to an accuracy of 1° C., although other values may also be used e.g. depending on a required accuracy. As can be seen, two times t1, t2 are measured in an alternating manner, which is performed in embodiments as described by applying two different currents to a semiconductor device like a bipolar transistor.

A section "DTS interface output" shows an output signal multiplexed to an output, for example by multiplexer 37 of FIG. 3, for reading out the time.

Timewise, the signals start with a power-up period followed by a self-calibration period of four clock bursts. The self-calibration may be performed as illustrated referring to FIGS. 5 and 6. The self-calibration is followed by normal operation where times t1, t2 are measured. These times may be averaged over a plurality of clock periods, for example 96 periods.

It should be noted that the signals specifically shown in FIG. 8 serve only for further illustration of some embodiments, and in other embodiments, other signal waveforms may be used.

At least some embodiments are defined by the examples given below:

Example 1

A device, comprising:
a capacitor,
a semiconductor component,
a current generator, wherein the current generator is configured to supply a charging current to the capacitor and to selectively supply at least a first current or a second current different from the first current to the semiconductor component, and
a time evaluation circuit coupled to the capacitor and to the semiconductor component and configured to measure a first charging time for charging the capacitor to a first voltage at the semiconductor component while the first current is supplied to the semiconductor component and a second time for charging the capacitor to a second voltage at the semiconductor component while the second current is supplied to the semiconductor component.

Example 2

The device of example 1, wherein the semiconductor component comprises at least one of a diode or a bipolar transistor.

Example 3

The device of example 1 or 2, wherein the time evaluation circuit comprises a comparator, wherein a first input of the comparator is coupled to a node between the current generator and the capacitor, and wherein a second input of the comparator is coupled to a node between the current generator and the semiconductor component.

Example 4

The device of example 3, further comprising a counter coupled to an output of the comparator.

Example 5

The device of example 4, wherein the counter is configured to be reset based on an output of the comparator.

Example 6

The device of any one of examples 1-5, wherein the time evaluation circuit further comprises a calculation circuit configured to calculate a temperature based on the first time and the second time.

Example 7

The device of any one of examples 1-6, further comprising an interface to output the first time and the second time.

Example 8

The device of any one of examples 1-7, wherein the current source comprises a proportional to absolute temperature current source.

Example 9

The device of any one of examples 1-8, wherein the first current is equal to the charging current, and the second current is an integer multiple of the first current.

Example 10

The device of any one of examples 1-9, wherein the device comprises a self-calibration circuit to calibrate the charging current to approximate a predetermined charging time.

Example 11

The device of example 10, wherein the current generator comprises a plurality of current sources, and wherein the self-calibration circuit is configured to determine a subset of current sources for generating the charging current.

Example 12

A method, comprising:
providing a first current to a semiconductor device,
measuring a first charging time for a capacitor to reach a first voltage at the semiconductor device while the first current is supplied,
providing a second current to the semiconductor device different from the first current, and
measuring a second charging time for the capacitor to reach a second voltage at the semiconductor device while the second current is supplied to the semiconductor device.

Example 13

The method of example 12, further comprising determining a temperature based on the first charging time and the second charging time.

Example 14

The method of example 12 or 13, further comprising calibrating a charging current for charging the capacitor.

Example 15

The method of example 14, wherein calibrating comprises performing a binary search to select current sources for providing the charging current.

Example 16

The method of any one of examples 12-15, wherein providing the first and second currents comprises providing a current proportional to absolute temperature.

Example 17

A temperature sensor device, comprising:
a current generator,
a capacitor coupled to the current generator,
a switch coupled in parallel to the capacitor,
a semiconductor component coupled to the current generator,
a comparator, wherein a first input of the comparator is coupled to a node between the current generator and the capacitor and wherein a second input of the current generator is coupled to a node between the current generator and the semiconductor component,
a counter coupled to an output of the comparator,
wherein the current generator is switchable between supplying a first current to the semiconductor component and supplying a second current different from the first current to the semiconductor component.

Example 18

The device of example 17, further comprising a first register coupled to the counter to store a count value while the first current is supplied to the semiconductor component and a second register coupled to the counter to store a second count value while the second current is supplied to the semiconductor component.

Example 19

The device of example 17 or 18, further comprising at least one chopper provided at at least one of an output of the current generator, in the current generator, at an input of the comparator or at an output of the comparator.

The above illustrated embodiments serve only as examples and are not to be construed as limiting.

What is claimed is:
1. A device comprising:
   a capacitor,
   a semiconductor component,
   a current generator, wherein the current generator is configured to supply a charging current to the capacitor and to selectively supply at least a first current or a second current different from the first current to the semiconductor component, and
   a time evaluation circuit coupled to the capacitor and to the semiconductor component and configured to measure a first charging time for charging the capacitor to a first voltage that matches a voltage at the semiconductor component while the first current is supplied to the semiconductor component and a second charging time for charging the capacitor to a second voltage that matches a voltage at the semiconductor component while the second current is supplied to the semiconductor component.
2. The device of claim 1, wherein the semiconductor component comprises at least one of a diode or a bipolar transistor.
3. The device of claim 1, wherein the time evaluation circuit comprises a comparator, wherein a first input of the comparator is coupled to a node between the current generator and the capacitor, and wherein a second input of the comparator is coupled to a node between the current generator and the semiconductor component.
4. The device of claim 3, further comprising a counter coupled to an output of the comparator.
5. The device of claim 4, wherein the counter is configured to be reset based on an output of the comparator.
6. The device of claim 1, wherein the time evaluation circuit further comprises a calculation circuit configured to calculate a temperature based on the first charging time and the second charging time.
7. The device of claim 1, further comprising an interface to output the first charging time and the second charging time.
8. The device of claim 1, wherein the current source comprises a proportional to absolute temperature current source.
9. The device of claim 1, wherein the first current is equal to the charging current, and the second current is an integer multiple of the first current.

10. The device of claim 1, wherein the device comprises a self-calibration circuit to calibrate the charging current to approximate a predetermined charging time.

11. The device of claim 10, wherein the current generator comprises a plurality of current sources, and wherein the self-calibration circuit is configured to determine a subset of current sources for generating the charging current.

12. A method comprising:
providing a first current to a semiconductor device,
measuring a first charging time for a capacitor to reach a first voltage that matches a voltage at the semiconductor device while the first current is supplied,
providing a second current to the semiconductor device different from the first current, and
measuring a second charging time for the capacitor to reach a second voltage that matches a voltage at the semiconductor device while the second current is supplied to the semiconductor device.

13. The method of claim 12, further comprising determining a temperature based on the first charging time and the second charging time.

14. The method of claim 12, further comprising calibrating a charging current for charging the capacitor.

15. The method of claim 14, wherein calibrating comprises performing a binary search to select current sources for providing the charging current.

16. The method of claim 12, wherein providing the first and second currents comprises providing a current proportional to absolute temperature.

17. A temperature sensor device comprising:
a current generator,
a capacitor coupled to the current generator,
a switch coupled in parallel to the capacitor,
a semiconductor component coupled to the current generator,
a comparator, wherein a first input of the comparator is coupled to a node between the current generator and the capacitor and wherein a second input of the comparator is coupled to a node between the current generator and the semiconductor component,
a counter coupled to an output of the comparator,
wherein the current generator is switchable between supplying a first current to the semiconductor component and supplying a second current different from the first current to the semiconductor component.

18. The device of claim 17, further comprising a first register coupled to the counter to store a count value while the first current is supplied to the semiconductor component and a second register coupled to the counter to store a second count value while the second current is supplied to the semiconductor component.

19. The device of claim 17, further comprising at least one chopper provided at at least one of an output of the current generator, in the current generator, at an input of the comparator or at an output of the comparator.

20. The device of claim 17,
wherein the comparator is configured to detect that a voltage at the capacitor matches a voltage at the semiconductor component while the current generator supplies the first current to the semiconductor component, and
wherein the comparator is configured to detect that a voltage at the capacitor matches a voltage at the semiconductor component while the current generator supplies the second current to the semiconductor component.

* * * * *